United States Patent [19]
Hernandez et al.

[11] 3,950,997
[45] Apr. 20, 1976

[54] PRECISION PNEUMATIC NULL BALANCE PRESSURE TRANSDUCER

[75] Inventors: Ernest Norman Hernandez, Seattle; Charles Robert Dantzler, Issaquah, both of Wash.

[73] Assignee: Terra Technology Corporation, Seattle, Wash.

[22] Filed: Oct. 29, 1974

[21] Appl. No.: 518,376

[52] U.S. Cl. .................................... 73/410; 73/396
[51] Int. Cl.² ........................................... G01L 7/06
[58] Field of Search ................ 73/410, 388 BR, 396

[56] References Cited
UNITED STATES PATENTS

| | | | |
|---|---|---|---|
| 2,092,844 | 9/1937 | Hoekstra | 73/410 |
| 2,374,945 | 5/1945 | Minter | 73/388 BR |

*Primary Examiner*—Donald O. Woodiel
*Attorney, Agent, or Firm*—Christensen, O'Connor, Garrison & Havelka

[57] ABSTRACT

A pneumatic null balance pressure transducer comprising a valve body having an inlet duct and an outlet duct, an inwardly projecting metallic bellows and a stem-operated pneumatic valve is disclosed. The stem-operated pneumatic valve is mounted in the valve body so as to be in contact with the bellows in a manner such that movement of the bellows moves the stem of the valve. In operation, external pressure, created by the pressure source to be measured, is applied to the cavity defined by the inwardly projecting metallic bellows. This pressure is balanced against internal pressure generated by a suitable gas source. At balance, the valve closes. In its preferred manner of use, the closed valve captures pressure and the captured pressure is read on a suitable pressure gauge.

3 Claims, 3 Drawing Figures

PRECISION PNEUMATIC NULL BALANCE PRESSURE TRANSDUCER

BACKGROUND OF THE INVENTION

This invention is directed to pressure measurements, and more particularly to pressure transducers suitable for use in pressure measuring systems.

Systems for measuring pressure are used in a wide variety of fields. For example, civil engineers are often required to measure pore pressure, differential pressure, and total pressure in various pneumatic and hydraulic environments, often over extended periods of time. Because of the long time periods involved, the pressure measuring systems they use require the inclusion of a pressure sensing transducer that has long-term stability. More precisely, they require a small, accurate transducer that has low volumetric displacement, high linearity and zero-point stability.

In the past, a variety of small pressure transducers have been proposed for use in measuring systems of the type used by civil engineers and the like. For a variety of reasons, the prior art transducers have not been entirely satisfactory. One of the primary reasons prior art transducers have not been entirely satisfactory relates to their inclusion of rubber or metal diaphragms. The diaphragms are usually mounted in a chamber and sense differential pressure created by pressure applied to the opposing sides of the diaphragm. The diaphragm is, in turn, connected via a linkage to a mechanical indicating device. The result is a somewhat complex, relatively inaccurate, pressure sensing transducer and indicating device. These devices are relatively inaccurate for various reasons. First, their use of mechanical linkages creates the normal inaccuracies associated with such linkages, such inaccuracies increasing with wear and age. Second, diaphragms are relatively non-linear, particularly as they approach the extremes of their path of travel. Moreover, diaphragms have a relatively short path of travel and, thus, a limited range of operation. These devices are not only inaccurate, they are also more complex than desirable. Further, such structures are often larger than desirable.

Therefore, it is an object of this invention to provide a new and improved pneumatic pressure sensing transducer.

It is a further object of this invention to provide a pneumatic pressure transducer suitable for use in systems designed to measure pneumatic or hydraulic pressure.

It is a still further object of this invention to provide a precision pneumatic null balance pressure transducer that is highly accurate, includes a minimal number of parts, is highly stable over a long period of time, has low volumetric displacement, has high linearity and has zero-point stability, yet is relatively small in size and inexpensive to manufacture.

SUMMARY OF THE INVENTION

In accordance with principles of this invention, a precision pneumatic null balance pressure transducer is provided. The transducer of the invention comprises a valve body having a first and second ducts. Affixed to one end of the body is a bellows housing which supports an inwardly projecting metal bellows. The inwardly projecting metal bellows defines a bellows chamber that is open to the surrounding environment. Mounted in the valve body is a small stem-operated pneumatic valve. The stem of the pneumatic valve impinges on the bellows in a manner such that the position of the bellows controls the opening and closing of the valve. A gas pressure path extends from one duct to the other duct, through the valve and a transducer chamber surrounding the bellows chamber.

In one operative environment, external pneumatic or hydraulic pressure applied to the bellows chamber is balanced against internal pressure generated by a gas pressure source connected to the first duct. The first duct conveys the pressurized gas to the transducer chamber, through the stem-operated pneumatic valve. When the pressures applied to opposite sides of the bellows are equal, the valve is closed. Closing the valve traps captures pressurized gas in the second duct, said duct being connected to a suitable pressure gauge. The captured gas pressure is read on the pressure gauge and is equal to the external pressure, plus a small correction factor created by the spring constants of the bellows and the valve, if the valve is maintained slightly open when the transducer is in its quiescent state, as is preferred.

In accordance with further principles of this invention, the valve body and the bellows housing are generally cylindrical in shape. Longitudinally formed in the body is a partially threaded cylindrical aperture. The valve, which preferably comprises a pneumatic tire valve, is threaded into the cylindrical aperture in substantially the same way that this type of valve is normally threaded into a pneumatic tire. The first duct communicates with the "interior" end of the valve and the second duct communicates with the "exterior" end of the valve, via the transducer chamber. The valve stem axis and the bellows axis are coincident.

It will be appreciated from the foregoing brief summary that the invention comprises a precision pneumatic null balance pressure transducer. The invention includes a minimum number of inexpensive components coupled together in a highly accurate manner. Specifically, the preferred form of the invention only comprises three major components: a valve body; a pneumatic valve; and, a bellows housing which supports a metal bellows.

One of the principal reasons for the accuracy of the invention relates to its nulling characteristic, i.e., its use of a null balance approach to controlling pressure measurement, as opposed to direct pressure measurement. Because the stem of the pneumatic valve is directly connected to the bellows, without any intermediate mechanical linkage, the resultant pressure measurement does not include the errors which normally accompany such linkages. Further because of its minimal number of components and manner of construction, the invention is suitable for use over extended periods of time, in the order of years, without loss of stability. Moreover, it has low volumetric displacement, relatively high linearity and zero-point stability, all of which are requirements of a pressure transducer useful in the civil engineering field, as discussed above. Finally, it is relatively small in size, as will be readily understood by the size of the preferred form of the pneumatic valve.

BRIEF DESCRIPTION OF THE DRAWINGS

The foregoing objects and many of the attendant advantages of this invention will become more readily appreciated as the same becomes better understood from the following detailed description when taken in conjunction with the accompanying drawings wherein.

DESCRIPTION OF THE PREFERRED EMBODIMENT

Figure 1:
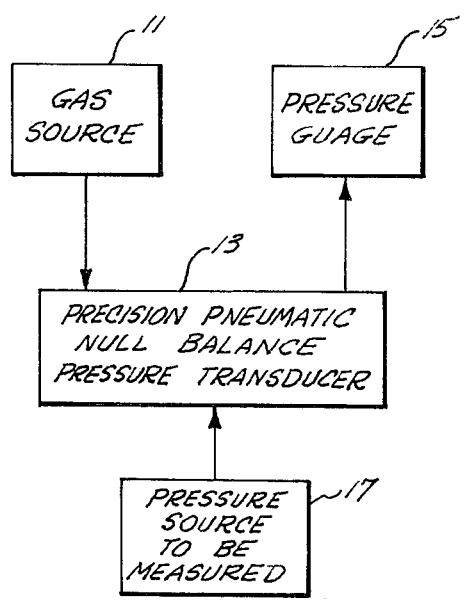
FIG. 1 is a block diagram illustrating the present invention mounted in the preferred manner in a pressure measuring system for measuring the pressure created by a pressure source.

FIG. 1 is a block diagram generally illustrating the preferred manner of connection of the precision pneumatic null balance pressure transducer of the invention in a pressure measuring system. Specifically, FIG. 1 illustrates a gas source 11 connected to the input of the pneumatic null balance pressure transducer 13 of the invention. The pneumatic null balance pressure transducer 13 is also connected to a pressure gauge 15. In operation, a source of pressure 17 (pneumatic or hydraulic) whose intensity is to be measured is balanced by the pneumatic null balance pressure transducer 13 against pressure created by the gas source 11. When balance is achieved, the pressure of the gas extending between the transducer 13 and the pressure gauge 15 is trapped and read on the gauge. At balance, the pressure gauge reading, plus a minor correction factor (related to certain spring constants), is equal to the pressure of the pressure source 17. In an alternate form, referred to as the reverse mode of operation, pressure created by the gas source is applied through a suitable control mechanism. The amount of applied pressure is just equal to the amount needed to balance the transducer, as determined by sensing whether or not any gas is emitted from the transducer. The pressure applied to the pneumatic null balance pressure transducer in the reverse mode of operation is, thus, related to the pressure created by the pressure source to be measured.

As will be better understood from the following description of a preferred embodiment, the precision pneumatic null balance pressure transducer of the invention is basically a balancing device wherein gas pressure, generated by the gas source 11, is balanced against gas or fluid pressure created by the pressure source 17. Pressure created by the pressure source is applied to the chamber of an inwardly projecting bellows. The bellows lies in a transducer chamber and is directly connected to the control element of a pneumatic valve. Expansion of the bellows chamber opens the valve and allows gas from the gas source 11 to flow through the transducer chamber to the pressure gauge 15. The gas flow creates pressure in the transducer chamber which causes the bellows to compress. When balance occurs the compression pressure substantially equals the expansion pressure and the valve closes. At this point, pressure created by gas trapped between the transducer and the pressure gauge causes a pressure gauge reading that is equal to the pressure of the pressure source 17, except for a minor correction factor created by spring constants. More specifically, preferably, when the transducer is in its quiescent state (atmospheric pressure applied to both sides of the bellows), the bellows holds the valve slightly open. This slight opening is created by the spring constants of the bellows and the valve and causes the minor correction factor, which is described in more detail below.

Figure 2:
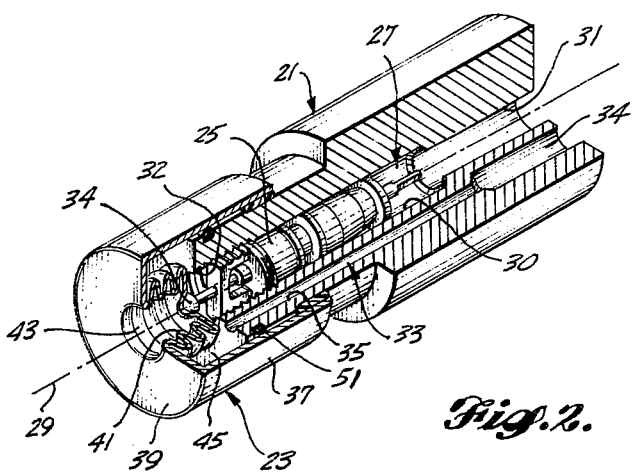
FIG. 2 is an isometric view of a preferred embodiment of a pneumatic null balance pressure transducer formed in accordance with the invention and, FIG. 3 is a cross-sectional view of the pneumatic null balance pressure transducer illustrated in FIG. 2 along its longitudinal axis.
Figure 3:
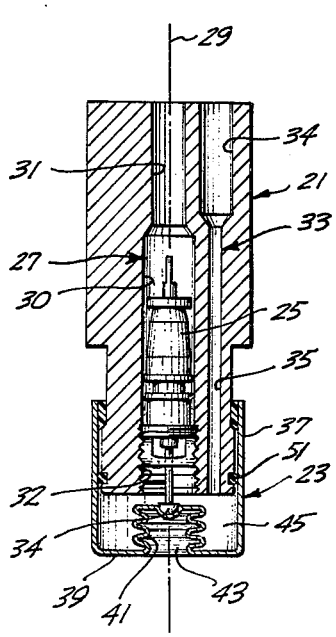

FIGS. 2 and 3 illustrate a preferred embodiment of the invention and comprise: a valve body 21; a bellows housing 23; and, a pneumatic valve 25. The valve body is illustrated as an elongated, generally cylindrical metal structure and includes a central aperture 27 extending entirely through the valve body along its longitudinal axis 29. One end of the central aperture 27 is necked down into a smaller cylindrical region that defines a first duct 31. The larger region 30 of the central aperture 27 is threaded at its outer end 32 and houses the pneumatic valve 25.

Preferably, the pneumatic valve 25 is a pneumatic tire valve of the type widely used in pneumatic automobile, bicycle, truck tires and the like. Since these valves are widely used and, thus, well known, a description of their internal structure and operation is not presented here. It will be appreciated, however, that such valves include stems that project outwardly along their longitudinal axis, and that they are adapted to be threaded into a threaded aperture, usually a valve stem. In a similar manner, a valve of this nature is threaded into the threaded end 32 of the larger region 30 of the central aperture 27. The valve 25 is positioned such that the outer tip 34 of the valve stem, extends outwardly beyond the edge of the threaded end of the larger region 30.

Formed in the valve body 21 and aligned along an axis located parallel to the axis 29 of the central aperture 27 is a second duct 33. The second duct comprises an enlarged region 34 located adjacent to the first duct 31 and a reduced region 35 located adjacent to the larger region 30 of the central aperture 27. Reduced region 35 terminates at the end of the valve body 21 at a point adjacent to the threaded end of the central aperture 27.

The bellows housing 23 is in the form of a metal cap that includes a generally cylindrical body portion 37 and an end 39. The body portion 37 surrounds the end of the valve body 21 containing the threaded end of the central aperture and the opening into the reduced region 35 of the second duct.

Projecting inwardly from the end 39 of the bellows housing is a metal bellows 41. Thus, the metal bellows 41 defines a bellows chamber 43 that communicates with the surrounding environment. The valve and the bellows are formed and positioned such that the tip 34 of the stem of the valve 25 impinges on the center of the inner surface 47 of the bellows 41. The longitudinal axis of the bellows and the stem are coincident with each other, and are coincident with the longitudinal axis 29 of the valve body 21.

The body portion 37 of the bellows housing is attached by a suitable adhesive 49, such as a suitable epoxy, for example, to the valve body 21. In addition, an O-ring seal 51 is located between the valve body 21 and the cylindrical body portion 37 of the bellows housing 23. The O-ring seal prevents pressure leaking from the transducer chamber 45 formed between the bellows housing and the valve body.

As noted above, preferably, the bellows 41 biases the valve slightly open, when atmospheric pressure is applied to either side of the bellows, i.e., the transducer is in its quiescent state. Thus, when balance occurs, the reading on the pressure gauge $P_g$ and the pressure to be measured ($P_f$) are related in accordance with the following equation:

$$\frac{P_g}{A_B} = \frac{P_f}{A_B} + (k_b - k_s)x_c$$

where:
- $P_g$ equals the gauge pressure;
- $P_f$ equals the actual fluid pressure applied to the bellows chamber;
- $A_B$ equals the area of the bellows;
- $k_b$ equals the spring constant of the bellows;
- $k_s$ equals the spring constant of the valve; and
- $x_c$ equals the distance of movement of the valve stem between the quiescent and closed states of the valve.

In the "forward" or preferred mode of operation, the first duct is connected to the gas source and the second duct is connected to the pressure gauge 15 and the structure operates in the manner discussed above. In the reverse mode of operation, the pressure source is applied to the second duct, rather than being applied to the first duct, as in the forward mode of operation. The first duct, in the reverse mode is applied to a suitable pressure gauge. The pressure applied through the second duct is increased in value until it just causes the valve to close. At this point, the gauge indication reads zero. At this point, the gas pressure applied, is just equal to the pressure being sensed.

While a preferred embodiment of the invention is structured such that the valve is maintained slightly open when the transducer is in its quiescent state, it may be designed such that the valve is closed when the transducer is in its quiescent state, if desired. Such a structure usually will be preferred if the invention is used in its "reverse" mode of operation, described above. In any event, if $x_c$ equals zero, the applied pressure will exactly equal the pressure of the pressure source to be measured.

With respect to the positioning of the bellows housing 23 with respect to the tip 34 of the stem of the valve 25 to maintain the valve open when the transducer is in its quiescent state, this position is set when the structure is initially formed. More specifically, pressure is applied to the first duct and read on a pressure gauge connected to the second duct. While this action is occurring, the bellows housing 23 is positioned to obtain a position related captured pressure reading. When this reading is obtained, the bellows housing is "locked" in place with respect to the valve body and the adhesive 49 is applied and allowed to solidify. In this manner, the position of the valve stem is adjusted for the desired quiescent state valve opening.

It will be appreciated from the foregoing description of a preferred embodiment that an uncomplicated, yet precise, pneumatic null balancing pressure transducer is provided by the invention. This system is uncomplicated because it only includes three main components — a body, a bellows, and a stem valve. Because the invention is uncomplicated, it is relatively inexpensive to manufacture. With respect to size, preferably, the invention is approximately one-half inch in diameter and 2 inches long. Thus, the overall structure is relatively small in size. Further, because the valve eliminates mechanical coupling elements, errors created by such elements, and their increase due to wear over extended periods of time, is eliminated.

While a preferred embodiment of the invention has been illustrated and described, it will be appreciated by those skilled in the art and others that various changes can be made therein without departing from the spirit and scope of the invention. For example, the housing can be shaped other than cylindrical, if desired. In addition, the orientation of the various components and the ducts through the housing can be changed as necessary to meet the requirements of a particular environment of use. Hence, the invention can be practiced otherwise than as specifically described herein.

The embodiments of the invention in which an exclusive property or privilege is claimed are defined as follows:

1. A pneumatic null balance pressure transducer comprising:
   a cylindrical elongated valve body having a longitudinal aperture located along the longitudinal axis of said cylindrical elongated valve body, said longitudinal aperture including a threaded access opening located on one end thereof;
   a stem operated, threaded pneumatic tire valve threaded into said aperture in said valve body such that the outer end of said stem of said stem operated pneumatic tire valve extends slightly outwardly from the outer end of said threaded access opening in said valve body so that the tip of said stem lies beyond said one end of said cylindrical elongated valve body; and
   a cylindrical metal cap affixed to and surrounding said one end of said elongated valve body, said metal cap including an inwardly projecting metal bellows that defines a bellows chamber, said bellows chamber being coaxially aligned with the longitudinal axis of said stem, the end of said bellows chamber nearest said stem being closed by an end plate adapted to impinge on the outer tip of said stem in a manner such that said pneumatic tire valve is held slightly open when the same pressure is simultaneously applied to both sides of said metal bellows, the end of said bellows chamber furthest from said stem being open to allow the entry of a medium whose pressure is to be sensed by said pneumatic null balanced pressure transducer, said inwardly projecting metal bellows positioned such that the impingement of said end plate on the stem of said stem operated pneumatic tire valve controls the longitudinal position of said stem, the region between the outer surface of said inwardly projecting bellows, the inner surface of bellows surrounding portions of said metal cap and said one end of said valve body defining a transducer chamber;
   said valve body including a first duct in communication with the end of said longitudinal aperture remote from the end thereof from which said stem of said stem operated pneumatic tire valve projects and a second duct in communication with said transducer chamber;
   said valve structure being formed such that the reading on a pressure gauge affixed to said second duct created by a gas source affixed to said first duct and the pressure of said medium whose pressure is to be sensed are equated by the following equation:

$$\frac{P_g}{A_B} = \frac{P_f}{A_B} + (k_b - k_s)x_c$$

where:
- $P_g$ equals the gauge pressure;

$P_f$ equals the actual fluid pressure applied to the bellows chamber by the medium whose pressure is to be sensed;

$A_B$ equals the area of the bellows;

$k_b$ equals the spring constant of the bellows;

$k_s$ equals the spring constant of the stem operated pneumatic tire valve; and, $x_c$ equals the distance of movement of the valve stem between the slightly open position created when atmospheric pressure is simultaneously applied to both sides of said metal bellows and the closed state of said stem operated pneumatic tire valve.

2. A pneumatic null balance pressure transducer as claimed in claim 1 including an O-ring seal located between said bellows housing and said valve body.

3. A pneumatic null balance pressure transducer as claimed in claim 2 wherein said metal cap is attached to said valve body by a suitable adhesive.

* * * * *